United States Patent
Ayambem et al.

(10) Patent No.: US 6,645,291 B2
(45) Date of Patent: *Nov. 11, 2003

(54) JOINT COMPOUND AND METHOD OF USING SAME

(75) Inventors: Amba Ayambem, East Amherst, NY (US); Gopalakrishnan Sethuraman, East Amherst, NY (US); Richard E. Smith, Williamsville, NY (US)

(73) Assignee: National Gypsum Properties, LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/229,725

(22) Filed: Aug. 28, 2002

(65) Prior Publication Data

US 2003/0105204 A1 Jun. 5, 2003

Related U.S. Application Data

(63) Continuation of application No. 09/838,462, filed on Apr. 19, 2001, now Pat. No. 6,436,185

(60) Provisional application No. 60/199,860, filed on Apr. 26, 2000.

(51) Int. Cl.$^7$ .............................................. C04B 14/26
(52) U.S. Cl. ........................ 106/793; 106/794; 106/817
(58) Field of Search ................................ 106/793, 794, 106/817, 106, DIG. 3

(56) References Cited

U.S. PATENT DOCUMENTS 6,436,185 B1 * 8/2002 Ayambem et al. .......... 106/793

* cited by examiner

Primary Examiner—Paul Marcantoni
(74) Attorney, Agent, or Firm—Howrey Simon Arnold & White, LLP

(57) ABSTRACT

A joint compound includes water, calcium carbonate, and a water-soluble polymeric set retarder formed from a monomer having two or more carboxyl groups. The joint compound is useful in various applications and in a hybrid joint compound made with a calcium sulfate hemihydrate setting-type joint compound.

23 Claims, No Drawings

JOINT COMPOUND AND METHOD OF USING SAME

CROSS REFERENCE TO RELATED APPLICATIONS

This is a continuation of U.S. patent application Ser. No. 09/838,462 filed Apr. 19, 2001, now U.S. Pat. No. 6,436,185 which is a non-provisional application of U.S. Provisional Patent Application Ser. No. 60/199,860 filed Apr. 26, 2000.

BACKGROUND OF THE INVENTION

1. Field of the Invention

The invention generally relates to the production of cementitious compositions and, more specifically, the invention relates to the production of compounds for use in filling and coating joints between adjacent gypsum wallboard sheets, for repairing other imperfections in building materials, and for texturizing.

2. Brief Description of Related Technology

A common manner of constructing interior walls includes the use of inorganic wallboard panels or sheets such as gypsum wallboard, often referred to simply as "wallboard" or "drywall." Wallboard is typically produced by enclosing a core of an aqueous slurry of gypsum and other additives between two large sheets of paper. After the gypsum slurry has set and dried, the sheet is cut into standard sizes.

A wall is generally made by securing, e.g., with screws and/or nails, the wallboard to a support structure, for example vertically or horizontally-oriented pieces of wood. Because wallboard is typically.supplied in standard-sized sheets or panels, when forming a wall from the sheets there will generally be a number of joints between adjacent sheets. In most wallboard construction, it is necessary to conceal these joints between adjacent panels so that the wall will have a smooth, monolithic finish similar to that obtained with conventional wet plaster methods. It is also typically necessary to conceal the screws and/or nails used to secure the wallboard panels to framing, the indentations caused by the screws and/or nails, imperfections in the wallboard panels, and other materials (e.g., comer beads) used to form the wall.

A number of joint compound compositions (sometimes referred to by applicators as "mud") that can be used to conceal the joints between adjacent sheets of wallboard, other imperfections in the wallboard, and other construction points (e.g., comer beads) are known.

To conceal the joints between wallboard panels, a joint compound is typically applied in several layers or coats. A first coat of joint compound is placed in the joint between the wallboards with a wallboard knife, blade, or trowel. The first coat is primarily for the purpose of filling the space between the adjacent wallboards. Joint tape (for example, made of paper) can then be embedded into the first coat of joint compound. The joint compound may be applied in several, e.g., three, coats or layers in order to obtain a smooth finish. Each coat of joint compound must be allowed to dry or set prior to the placement of the next coat of joint compound. (If the prior coat is not allowed to dry or set, problems such as excess shrinkage and/or cracking can occur.) Once dry or set, the treated area is sanded before applying the next finishing coat of joint compound.

Joint compounds can be used for other purposes, for example, to repair imperfections in various building materials and for adding texture to walls and ceilings.

There are many different types of joint compounds: Joint compounds can be supplied in a dry powder form or in a mill-mixed, ready-mix form. They can also be of a "drying" type or a setting type.

The joint compound can be supplied in the form of a dry powder, to which an amount of water is added at the work site by the applicators to give the joint compound a suitable consistency. Other joint compounds, often referred to as "ready-mix" or "ready-mixed" joint compounds, are pre-mixed with water and other additives during manufacturing the product. These joint compounds are generally packaged and sold in a corrugated box or plastic pail in a form that is suitable for use with little or no addition of water at the job site.

Among the prior art joint compound compositions, it is generally known to use a filler (e.g., calcium carbonate, calcium sulfate hemihydrate, or calcium sulfate dihydrate), thickener, preservative, and a binder, as well as various other additives to produce a joint compound, as disclosed in U.S. Pat. No. 5,653,797 (Aug. 5, 1997), the disclosure of which is hereby incorporated herein by reference.

Many joint compounds are of the "drying" or "setting report" type. Drying-type joint compounds contain calcium carbonate ($CaCO_3$; i.e., limestone) and/or calcium sulfate dihydrate ($CaSO_4.2H_2O$) and/or talc ($Mg_3Si_4O_{10}(OH)_2$ or $3MgO.4SiO_2.H_2O$). Prior to use (generally during manufacturing), these components and a binder (along with several other ingredients) are mixed for a specific time with water. The drying-type joint compound thus produced has a high ionic content and basic pH. After application, when the compound dries (i.e., water evaporates), a dry, relatively hard cementitious material remains. The calcium sulfate dihydrate and calcium carbonate may comprise a substantial portion of what is sometimes referred to as the filler component.

Many conventional drying-type joint compounds undergo shrinkage upon drying, which makes it difficult to achieve a smooth wall surface. Shrinkage can be particularly troublesome when a.second coat of compound is applied over a previous coat that is not completely dried.

General ranges of ingredients used in an all purpose, conventional-weight, drying-type joint compound include the ingredients shown in Table 1, below.

TABLE 1

| CONVENTIONAL WEIGHT JOINT COMPOUND | |
|---|---|
| Ingredient | Weight Percentage |
| Water | 20–37 |
| Preservatives | 0.02–1.0 |
| Calcium Carbonate | 10–100 |
| Mica (Filler) | 0.5–5.0 |
| Attapulgite Clay (non-leveling agent) | 0.5–5.0 |
| Cellulose Thickener | 0.12–1.0 |
| Latex (Binder) | 1.0–4.0 |

To avoid various disadvantages of the drying-type of joint compound, compounds of the "setting type" have been developed. A setting-type joint compound generally includes calcium sulfate hemihydrate ($CaSO_4.\frac{1}{2}H_2O$, also referred to as calcined gypsum). (See U.S. Pat. No. 5,653,797.) To produce calcined gypsum, calcium sulfate dihydrate is converted from raw gypsum to the hemihydrate state via a suitable calcination process. A gypsum calcination process removes one and one-half molecules of water from each calcium sulfate dehydrate gypsum molecule. The hemihydrate form of calcium sulfate is substantially more soluble in water than the dihydrate form of calcium sulfate. The calcium sulfate hemihydrate may comprise a substantial portion of what is sometimes referred to as the filler component in a setting-type joint compound.

During use in a setting-type joint compound, the calcium sulfate hemihydrate is rehydrated to the dihydrate state via the addition of water. This rehydration process normally takes place over a fairly short period of time. Accordingly, it has been extremely difficult to produce a setting-type joint compound comprising hemihydrate gypsum pre-mixed with water, because the product would set in its storage container. Thus, joint compounds of the setting- type have generally had to be supplied in the powder form.

Ready-mixed, setting-type joint compounds are also known. For example, Jakacki et al. U.S. Pat. No. 4,661,161 (Apr. 28, 1987) discloses a setting-type joint compound comprising an aqueous slurry of calcium sulfate hemihydrate and a set retarding agent formed of two ingredients: an organic, proteinaceous retarder and a chelating agent, e.g., selected from diethylene triamine pentaacetic acid, ethylene diamine tetraacetic acid, and salts thereof. This patent discloses that the compound has an adequately long shelf life for commercialization, and that when mixed with an accelerator that the joint compound hydrates after a period of time to form a set material having acceptable joint compound properties. However, it is believed that joint compounds of the setting, ready-mix type have not been successfully commercially employed due to the need to find a suitable retarding agent and a suitable accelerator to overcome the retarding agent.

Setting-type joint compounds have the advantage of having generally quicker finishing times (setting time) than drying-type joint compounds. This is advantageous for the reasons stated above. Further, because setting joint compounds form a crystalline network upon setting (as opposed to merely drying), these compounds typically provide a strong, more durable bond between adjacent wallboard sheets than do drying-type joint compounds. However, because these compounds provide a strong crystalline network upon setting, the joint compound is often harder to sand to a smooth finish.

A calcium sulfate hemihydrate-based, setting-type joint compound can be combined with a calcium carbonate-based, drying-type joint compound to produce a joint compound having advantages of each individual type of compound. Such a hybrid joint compound can be used in applications typical of conventional drying-type and setting-type joint compounds.

One problem with this practice is that calcium carbonate acts as a calcium sulfate hemihydrate set accelerator. Thus, when a calcium sulfate hemihydrate-based, setting-type joint compound would, on its own, set in a time frame of about 210 minutes, its set time after having been mixed with a limestone-based drying-type joint compound (⅔ of hybrid joint compound by volume) is substantially reduced, to about 60 minutes. This drastic reduction in set time narrows in an unacceptable manner the working time window for finishers in the field to apply the compound.

One solution would seem to be the addition of a conventional set retarder to the drying-type joint compound. Others have disclosed retarding agents for use in certain other applications. However, although various types of retarders have been suggested, the purpose of the retarders, the final product, and the conditions under which the product is used (e.g., in wallboard manufacturing or cementing of pipes and casings of oil and gas wells) have differed substantially from the purpose, production conditions, and working conditions of joint compounds, particularly calcium carbonate-based, drying-type joint compounds.

For example, although wallboard manufacturers have used certain types of retarding agents, the purpose in that application is to prevent the immediate absorption of water and stiffening of the slurry during production, as well as to facilitate control of the slurry. In wallboard production, retarding agents are added to stabilize a stucco slurry for only a matter of seconds. It is understood that retarding agents are typically used in wallboard production at an extremely low rate, for example at about 0.0007 weight percent (e.g., in a 1400 pound batch, about 30 grams of retarder could typically be added).

When left in an aqueous, high ionic content, basic pH slurry system made up of such fillers as calcium carbonate and talc, conventional retarders completely lose their retarding potency towards calcium sulfate hemihydrate fairly rapidly, for example in as short as one day.

Accordingly, it would be desirable to provide a hybrid drying-type/setting-type joint compound that produces a strong durable bond between adjacent wallboard sheets and has reduced shrinkage, and yet is able to be sanded to a smooth finish like a drying-type joint compound. It would also be desirable to provide a ready-mixed, drying-type joint compound that reduces the accelerating effect of calcium carbonate towards the setting of calcium sulfate hemihydrate, and preferably which is also storage stable for periods required for practical and commercial use. Moreover, it would be advantageous to provide a method of producing a hybrid drying-type/setting-type joint compound that sets and/or dries in a time frame acceptable for practical and commercial use.

SUMMARY OF THE INVENTION

It is an objective of the invention to overcome one or more of the problems described above.

Accordingly, one aspect of the invention is a drying-type joint compound including water, calcium carbonate, and a water-soluble polymeric set retarder formed from a monomer having two or more carboxyl groups.

One embodiment of the invention provides a hybrid drying-type/setting-type joint compound including water, calcium carbonate, calcium sulfate hemihydrate, and a water-soluble polymeric set retarder formed from a monomer having two or more carboxyl groups.

Another embodiment of the invention provides a method of producing a hybrid drying-type/setting-type joint including the steps of forming a mixture of calcium carbonate and a water-soluble polymeric set retarder formed from a monomer having two or more carboxyl groups, forming a mixture of calcium sulfate hemihydrate and water, and combining the aforesaid mixtures.

Further aspects and advantages of the invention may become apparent to those skilled in the art from a review of the following detailed description, taken in conjunction with the appended claims. While the invention is susceptible of embodiments in various forms, described hereinafter are specific embodiments of the invention with the understanding that the disclosure is illustrative, and is not intended to limit the invention to the specific embodiments described herein.

DETAILED DESCRIPTION OF THE INVENTION

Generally, the invention is directed to joint compounds and methods of production thereof.

One aspect of the invention is a drying-type joint compound. A drying-type joint compound of the invention includes water, calcium carbonate (limestone), and a water-soluble polymeric set retarder (set inhibitor) formed from a monomer having two or more carboxyl groups.

The amount of water used in a drying-type joint compound of the invention can be from about 20 wt. % to about 37 wt. %, and is preferably in a range of about 25 wt. % to about 35 wt. %, and more preferably about 30 wt. % to about 33 wt. %, based on total weight of joint compound.

Calcium carbonate (limestone) may be purchased from Georgia Marble of Kennesaw, Ga., York Limestone of York, Pa., or Pfizer Limestone of New York, N.Y., for example. The calcium carbonate in a drying-type joint compound of the invention is preferably at least 50 weight percent (wt. %) and more preferably about 60 wt. % to about 70 wt. %, of the total weight of the joint compound.

Generally, a water-soluble polymeric set retarder used in the drying-type joint compound of the invention is formed from a monomer having two or more carboxyl groups. The term "water-soluble" is defined herein to mean a minimum solubility of 5% by weight in water at 25 ° C. The monomer can be, for example, a dicarboxylic acid, such as adipic acid, phthalic acid, sebacic acid, and maleic acid, and a derivative of a dicarboxylic acid (e.g., 2-methyl maleic acid, maleic anhydride, and ester derivatives). The monomer can also be a higher order carboxylic acid, and a derivative of a higher order carboxylic acid (including one or more of an anhydride and an ester). The monomer can also be a mixture of any of the foregoing named compounds.

Preferably, the monomer is an unsaturated dicarboxylic acid or a derivative of an unsaturated dicarboxylic acid (including one or more of an anhydride and an ester). More preferably, the monomer is selected from the group consisting of maleic acid, derivatives of maleic acid, and mixtures thereof. Most preferably, the monomer is selected from the group consisting of maleic anhydride, maleic acid, and mixtures thereof.

The water-soluble polymeric set retarder used in the drying-type joint compound of the invention can also be a salt of any of the foregoing named compounds and mixtures. Suitable salts include alkali metal salts, alkaline-earth metal salts, and ammonium salts. Sodium salts are preferred.

When an acid anhydride such as maleic anhydride is used as the monomer, it can be subsequently hydrolyzed to a carboxylic acid, either before adding it to calcium carbonate and water to form a drying-type joint compound of the invention, or in situ in the drying-type joint compound of the invention.

Another preferred monomer (and a preferred polymeric set retarder) includes two or more carboxyl groups on successive carbon atoms, the successive carbon atoms forming (becoming part of) the polymer backbone (chain). Stated another way, a preferred monomer includes at least two successive carbon atoms that form (become part of) the polymer chain, and includes at least two carboxyl groups on the successive carbon atoms (i.e., depend from the successive carbon atoms). Maleic acid and suitable derivatives of maleic acid are examples of this type of preferred monomer. In the case of maleic acid, the carboxyl groups depend directly from two successive carbon atoms, i.e., are bound directly to two successive carbon atoms, though this need not be the case. For example, one or more of the carboxyl groups can be separated from the corresponding successive carbon atom by one or more additional atoms, preferably a saturated or unsaturated $C_1$–$C_4$ moiety.

Generally, monomers in which the carboxyl groups are located on the molecule closer to the carbon atoms that form the polymer backbone are preferred. Likewise, polymeric set retarders in which the carboxyl groups are located on the polymer closer to the carbon atoms that form the polymer backbone are preferred.

Preferably, a monomer moiety has a $pK_1$ less than about 4.26, more preferably less than about 1.91. The lower a pK value (for example, $pK_1$), the greater the tendency of a carboxyl group (for example, the first carboxyl group) to dissociate and, by extension, the better its chances of interfering with gypsum crystal formation and growth.

The polymeric set retarder used in the drying-type joint compound of the invention can be a homopolymer or a copolymer. The term copolymer is defined herein to include terpolymers and higher order polymers. Copolymers are preferred, for reasons described below.

The polymeric set retarder used in the drying-type joint compound of the invention preferably has a molecular weight sufficiently low such that the set retarder does not over-thicken the drying-type joint compound of the invention into which it is incorporated. Preferably, the molecular weight of the polymeric set retarder is from about 1,000 to about 15,000, more preferably about 2,000 to about 5,000, most preferably about 3,000.

When using lower molecular weight monomers having two or more carboxyl groups (e.g., maleic acid), it is preferred to form a copolymer with one or more other monomers. Without intending to be bound by any particular theory, it is believed that it sometimes can be difficult to synthesize a homopolymer with a molecular weight as high as 3,000 using a low-molecular weight monomer such as maleic acid. Acrylates are particularly preferred monomers for forming copolymers with lower molecular weight monomers having two or more carboxyl groups, such as maleic acid or maleic anhydride.

Other suitable monomers for copolymerization with a monomer having two or more carboxyl groups include styrene, vinyl chloride, vinyl esters, acrylonitrile, acrylic acid, acrylate esters (e.g., methyl acrylate, ethyl acrylate, and n-butyl acrylate), salts of acrylic acid, salts of acrylate esters, acrylamide, acrolein, vinylsulfonic acid, allyl acetate, and alkenes such as ethylene, vinyl ketones, and carbon monoxide. Salts of the foregoing monomers may also be useful, particularly alkali metal salts; sodium salts are particularly preferred. Non-polar monomers (e.g., styrene, alkenes, etc.) are preferably added in such a way that they do not detrimentally affect the overall solubility of the resulting polymeric set retarder in aqueous systems. Copolymers may be assembled by any suitable method, in random or alternating additions, including by grafting a monomer having two or more carboxyl groups onto existing polymers, and by condensations.

The amount of monomer having two or more carboxyl groups within a copolymer preferably ranges from about 10% to about 90%, most preferably about 50%. In a higher molecular weight polymeric set retarder, the amount of monomer having two or more carboxyl groups may be lower, whereas in a lower molecular weight polymeric set retarder, the amount of monomer having two or more carboxyl groups may be higher. In a preferred drying-type joint compound of the invention, the amount of monomer having two or more carboxyl groups is about 50% and the molecular weight is about 3,000.

A preferred compound useful as a polymeric set retarder in the drying-type joint compound of the invention is sold under the trade name ALCOSPERSE 408 by Alco Chemical, a division of National Starch and Chemical Company. This polymeric set retarder is a sodium salt terpolymer of maleic acid, acrylic acid, and a third non-ionic or anionic monomer. Maleic anhydride is reported to make up over 50% of the repeating units within the polymer chain. ALCOSPERSE 408 terpolymer is reported to have a weight average molecular weight of about 3,000, and is marketed as a 43% aqueous solution.

The amount of polymeric set retarder used in the drying-type joint compound of the invention will vary depending on the particular application in which it is used. For example, when adding a drying-type joint compound of the invention to a setting-type joint compound having a relatively short set time, the amount of polymeric set retarder used in the drying-type joint compound of the invention will be greater. Likewise, when adding a greater proportion of a drying-type joint compound of the invention to a setting-type joint compound, the amount of polymeric set retarder used in the drying-type joint compound of the invention can be reduced. Generally, the polymeric set retarder can be about 0.001 wt. % to about 0.5 wt. %, preferably about 0.01 wt. % to about 0.1 wt. % of the drying-type joint compound, based on the total weight of the drying type joint compound.

Thus, for example, when adding about two parts by volume of a drying-type joint compound of the invention to one part by volume of a setting-type joint compound having a set time of about 210 minutes, the polymeric set retarder preferably is about 0.03 wt. % to about 0.08 wt. %, most preferably 0.04 wt. % of the drying-type joint compound, based on the total weight of the drying-type joint compound, to achieve a set time of about 80 to about 150 minutes, preferably about 120 minutes.

In a drying-type joint compound of the invention the amount of polymeric set retarder is preferably increased with increasing calcium carbonate content. Likewise, in a drying-type joint compound of the invention the amount of polymeric set retarder is preferably decreased with decreasing calcium carbonate content.

Optional ingredients in the drying-type joint compound of the invention include clay, mica, talc, binders, fillers, thickening agents, preservatives, defoaming agents, gypsum, latex, glycol, humectants, and other ingredients suitable for use in joint compounds.

The drying-type joint compound of the invention is generally produced by combining both solid and liquid ingredients. The solid ingredients used in the drying-type joint compound of the invention, described in greater detail below, can include limestone, perlite, clay, mica, thickeners, binders, talc, gypsum (calcium sulfate dihydrate), and urea. Two or more of the solid materials or ingredients can be pre-blended in a mixing apparatus or blender. The solid materials may include absorbed or chemically combined moisture.

The liquid ingredients used in the drying-type joint compound of the invention are also preferably pre-blended. Liquid ingredients used in the drying-type joint compound of the invention can include water, latex, glycol, dibutyl pthalate, preservatives, defoamers, and humectants. For example, water and latex (e.g., in the form of an emulsion) can be pre-blended, while the remaining liquid ingredients (described in detail below) can be separately pre-blended. Alternatively, all liquid ingredients can be pre-blended together.

Some ingredients, such as thickeners and polymeric set retarders useful in the invention, are available in either liquid form or powder form.

Generally, fillers and extenders can also be used in a drying-type joint compound of the invention. Suitable fillers include perlite, gypsum (calcium sulfate dihydrate), mica, and talc. Fillers are generally used to control the density of the joint compound, and may also provide other advantageous properties to a joint compound of the invention.

Perlite is preferably used in a drying-type joint compound of the invention to control the density, shrinkage, and crack resistance of the joint compound. An expanded perlite, such as SLCEL 43–34 expanded perlite, available from Silbrico Corp. of Chicago, Ill. is preferred. The amount of perlite used is preferably in a range of about 1 weight percent to about 6 wt. %, based on the total weight of joint compound. However, perlite need not be used in conventional weight joint compounds of the invention.

Mica is also preferably included in a drying-type joint compound of the invention. Mica, which is a low bulk density mineral used as a filler or extender, may be purchased from KGM Corp. of Kings Mountain, N.C. Mica may also improve crack resistance of the joint compound. The amount of mica used is preferably in a range of about 1 wt. % to about 4 wt. %, based on the total weight of joint compound.

Some embodiments of the inventive drying-type joint compound, in addition to limestone, also include gypsum (calcium sulfate dihydrate). The amount of gypsum used in the joint compound is preferably in a range of about 5 wt. % to about 60 wt. % (based on the total weight of joint compound).

Talc is preferably included in a drying-type joint compound of the invention to enhance application properties and also as a white extender pigment. Talc, such as the TALEROM or MP 45-26 products manufactured by Barretts Minerals Inc., of Dillon, Mont., may be used in the joint compound. The amount of talc used in the joint compound is preferably in a range of about 1 wt. % to about 4 wt. %, based on the total weight of joint compound.

Clay is preferably used in a drying-type joint compound of the invention as a non-leveling agent and/or a thickening agent that controls the viscosity or rheology of the final product. Clay also helps enhance or create the water-holding properties of the joint compound. A clay such as SUPER-GEL B/Mil White clay available from Mil White of Houston, Tex., can be used. The amount of clay used is preferably in a range of about 1 wt. % to about 4 wt. %, based on the total weight of joint compound.

Thickeners are used to control the viscosity, affect the rheology, and affect the water holding characteristics of a joint compound. Suitable thickeners can include the METHOCEL HPMC-40320 product manufactured by Dow Chemical of Midland, Mich., and products sold under the trade names HEC Nexton-IPSA, IP8A, and 3082R by Aqualon Chemical Company of Wilmington, Del., a division of Hercules Chemical. The amount of thickener used in a drying-type joint compound of the invention is preferably in a range of about 0.1 wt. % to about 5 wt. %, based on the total weight of joint compound. More specifically, the amount of a METHOCEL product used in the joint compound is preferably about 0.1 wt. % to about 1 wt. %, based on weight of joint compound. The amount of a HEC, IP5A, IP8A, and 3082R thickener used in the joint compound may be in a range of about 0.1 wt. % to about 5 wt. %, based on the total weight of joint compound.

Binders are preferably used in a drying-type joint compound of the invention to improve bonding to the substrate such as wallboard. Suitable binders can include polyvinyl alcohol, available from Air Products of Allentown, Pa. A binder is preferably included in a range of about 0.1 wt. % to about 0.4 wt. %, based on the total weight of joint compound.

A glycol can be used in a joint compound to provide functional properties to the joint compound such as wet edge, open time, controlling drying time, and freeze/thaw stability. Glycols, such as diethyl glycol, manufactured by Dow Chemical Co. of Midland, Mich., and ethylene glycol and propylene glycol are preferred. The amount of glycol used in a drying-type joint compound of the invention is preferably in a range of about 0.1 wt. % to about 1 wt. %, based on total weight of joint compound.

Latex, such as Air Flex 530BP manufactured by Air Product of Allentown, Pennsylvania, and Reichhold 40716 manufactured by Reichhold Corp. of Raleigh, N.C., can be used in the joint compound. Additional latexes that can be used include ethylene vinyl acetate, polyvinyl acetate emulsion, and vinyl acetate acrylate latex. The amount of latex used in a drying-type joint compound is preferably in a range of about 2 wt. % to about 2.9 wt. %, based on total weight of joint compound.

A defoamer, such as the NXZ 9201A defoamer manufactured by Geo Chemical of Clasterd, N.J., can be included in a drying-type joint compound of the invention, preferably in a range of about 0.1 18 wt. % to about 0.125 wt. %, based on total weight of joint compound. Generally, any hydrocarbon-based or silicon-based defoamer may be used.

A humectant, such as sorbitol available from Rogette Corp. of Gurnee, Ill. can be included in a drying-type joint compound of the invention, preferably in a range of about 0.01 wt. % to about 0.05 wt. %, based on total weight of joint compound.

The drying-type joint compound of the invention is a multi-purpose joint compound, useful both in applications where a conventional drying-type joint compound would be used, and in combination with a setting-type joint compound to create a hybrid joint compound useful in a variety of applications, both where setting-type joint compounds are useful and where drying-type joint compounds are useful.

The drying-type joint compound of the invention, when combined with a calcium sulfate hemihydrate-based, setting-type joint compound and water, produces a hybrid joint compound that has advantages of both individual types of joint compounds (such as good strength and ease of sanding), yet sets and/or dries in a time frame acceptable for practical and commercial use.

For example, whereas a drying-type joint compound of the prior art, when combined with a conventional setting-type joint compound (having a setting time of about 210 minutes) in a ratio of 2:1 by volume (drying:setting) would dry and/or set in as little as 60 minutes, a hybrid joint compound of the invention made with the same conventional setting-type joint compound (having a setting time of about 210 minutes) preferably sets and/or dries in about 80 to about 150 minutes, most preferably about 130 minutes.

The drying-type joint compound of the invention can also be used as if it were a conventional drying-type joint compound, the polymeric set retarding composition used in the joint compound of the invention having no deleterious effects on the joint compound's performance when used alone.

Thus, another aspect of the invention is a hybrid joint compound including a water-soluble polymeric set retarder formed from a monomer having two or more carboxyl groups, water, calcium carbonate, and calcium sulfate hemihydrate. Preferably, the hybrid joint compound includes at least about 10 wt. % calcium carbonate. Preferably, the hybrid joint compound includes at least about 10 wt. % calcium sulfate hemihydrate.

Water-soluble polymeric set retarders useful and preferred in a hybrid joint compound of the invention are those described above in relation to the drying-type joint compound of the invention.

When used in a hybrid joint compound, the amount of the water-soluble polymeric set retarder can vary depending upon the setting time of the particular setting-type joint compound used, the relative amounts of each type of joint compound used, and the setting time desired for the hybrid joint compound.

Another aspect of the invention is a method of forming a hybrid drying-type/setting-type joint compound including the steps of forming a first mixture of water, a water-soluble polymeric set retarder formed from a monomer having two or more carboxyl groups, and calcium carbonate, forming a second mixture of calcium sulfate hemihydrate and water, and combining the first and second mixtures.

The first mixture of water, a water-soluble polymeric set retarder formed from a monomer having two or more carboxyl groups, and calcium carbonate preferably includes at least about 10 wt. % calcium carbonate based upon the weight of the entire first mixture. This mixture also preferably includes the preferred optional ingredients recited above in relation to the drying-type joint compound of the invention, in the preferred ranges recited. Moreover, this mixture can contain the additional optional ingredients recited above in relation to the drying-type joint compound of the invention, in the preferred ranges recited. This mixture can also contain additional optional ingredients suitable for use in joint compounds that do not otherwise interfere with the set time.

The second mixture of calcium sulfate hemihydrate and water preferably includes at least about 10 wt. %, more preferably at least about 30 wt. %, most preferably at least about 90 wt. % calcium sulfate hemihydrate, based upon the weight of the entire mixture. This mixture also preferably includes talc and a suitable set retarder. This second mixture can optionally include mica, latex, methylcellulose, a fungicide, a defoamer, a stabilizer, and other additives useful in setting-type joint compounds.

Preferably, the first mixture is combined with the second mixture in a ratio of 2:1 by volume (drying:setting).

EXAMPLES

The following examples are provided to illustrate the invention but are not intended to limit the scope of the invention.

Example 1

A compound useful as a water-soluble polymeric set retarder in the drying-type joint compound of the invention, ALCOSPERSE 408 terpolymer, was added in various amounts to a conventional all-purpose, drying-type joint compound (GOLD BOND all-purpose joint compound, sold by National Gypsum Company). The drying-type joint compound with polymeric set retarder was allowed to stand for various amounts of time, from 4 days to 6 months. Next, an amount of a conventional setting-type calcium sulfate hemihydrate-containing dry powder joint compound (STA SMOOTH (210), sold by National Gypsum Company) equivalent to one part by volume was weighed and placed into a container, followed by the addition of two parts by volume of the GOLD BOND all-purpose joint compound with polymeric set retarder, and a small amount of water, and the components were mixed. The various volumes were correlated, approximately, with weights. Approximate set time was measured for each composition. Compositions and set times are tabulated below.

TABLE 2

| STA SMOOTH 210 | GOLD BOND AP | water | ALCOSPERSE 408 (% of total weight of GOLD BOND AP) | time elapsed before mixing | approximate set time |
|---|---|---|---|---|---|
| 33.0 g | 186.5 g | 5.6 g | 0.03 | 4 days | 80 min |
| 33.0 g | 186.5 g | 5.1 g | 0.05 | 4 days | 150 min |
| 33.0 g | 186.5 g | 5.0 g | 0.05 | 10 days | 135 min |
| 33.0 g | 186.5 g | 5.0 g | 0.05 | 21 days | 145 min |
| 33.0 g | 186.5 g | 5.0 g | 0.05 | 6 months | 140 min |

The results show that a drying-type joint compound of the invention is storage stable (i.e., does not lose its set retarding potency towards calcium sulfate hemihydrate) for at least 6 months.

Comparative Example 2

Compositions consisting of GOLD BOND all purpose drying-type joint compound and one of two different sodium polyacrylate copolymers were prepared. The sodium polyacrylate copolymers used are sold under the trade names RHODOLINE 231 (acrylamide-acrylic acid copolymer sodium salt) and RHODOLINE A77 (proprietary formulation), by Rhodia Inc., Cranbury, N.J. Each composition contained 373.0 g of GOLD BOND all purpose drying-type joint compound and 0.007 wt. % to 0.1 wt. % (based on the weight of drying type joint compound) of either RHODOLINE 231 sodium polyacrylate copolymer or RHODOLINE A77 sodium polyacrylate copolymer.

The drying-type joint compound with sodium polyacrylate copolymer was either immediately combined with a setting-type joint compound and water, or allowed to stand for various amounts of time.

Two parts by volume of the drying-type joint compound with additive thus made were added to one part by volume (66.0 g) of STA SMOOTH 210 setting-type joint compound and 5.0 g of water, and mixed.

When the drying-type joint compound with sodium polyacrylate copolymer additive was immediately mixed with the STA SMOOTH 210 setting-type joint compound and water, set times were increased to about 3 to 4 hours (with 0.01 wt. % additive) and to over 4 days (with 0. 1 wt. % additive), compared to 75 minutes using no additive. Specifically, the set time was increased to 160 minutes when using 0.007 wt. % RHODOLINE A77 sodium polyacrylate copolymer.

However, when the drying-type joint compound with either sodium polyacrylate copolymer was allowed to stand, the additive lost its retarding potency fairly rapidly—in as little time as within a twenty four hour period—and was completely ineffective at 21 days standing time. Specifically, the set time after 21 days was 80 minutes using 0.007 wt. % RHODOLINE A77 sodium polyacrylate copolymer.

The foregoing description is given for clearness of understanding only, and no unnecessary limitations should be understood therefrom, as modifications within the scope of the invention may be apparent to those having ordinary skill in the art.

What is claimed is:

1. A joint compound, comprising
   about 20 wt. % to about 37 wt. % of water;
   at least about 50 wt. % of calcium carbonate; and
   about 0.001 wt. % to about 0.5 wt. % of a water-soluble polymeric set retarder formed from a monomer having at least two moieties bound to successive carbon atoms, wherein the successive carbon atoms form at least part of the polymeric backbone of the polymeric set retarder, and wherein the at least two moieties each contain at least one carboxyl group.

2. The joint compound of claim 1, wherein the monomer is an unsaturated dicarboxylic acid or a derivative of an unsaturated dicarboxylic acid.

3. The joint compound of claim 1, wherein the monomer is selected from the group consisting of maleic acid, derivatives of maleic acid, and mixtures thereof.

4. The joint compound of claim 1, wherein the polymeric set retarder has a weight average molecular weight of about 1,000 to about 15,000.

5. The joint compound of claim 1, wherein the polymeric set retarder is a homopolymer or a copolymer.

6. The joint compound of claim 1, wherein the polymeric set retarder is a terpolymer formed from:
   maleic acid;
   acrylic acid; and
   a nonionic or anionic monomer.

7. The joint compound of claim 1, comprising about 0.01 wt. % to about 0.1 wt. % polymeric set retarder.

8. The joint compound of claim 1, comprising at least about 60 wt. % calcium carbonate.

9. A joint compound consisting essentially of about 20 wt. % to about 37 wt. % of water;
   at least about 50 wt. % of calcium carbonate; and
   about 0.001 wt. % to about 0.5 wt. % of a water-soluble polymeric set retarder formed from a monomer having at least two moieties bound to successive carbon atoms, wherein the successive carbon atoms form at least part of the polymer backbone of the polymeric set retarder, and wherein the at least two moieties each contain at least one carboxyl group.

10. The joint compound of claim 9, wherein the polymeric set retarder has a weight average molecular weight of about 1,000 to about 15,000.

11. The joint compound of claim 9, wherein the polymeric set retarder is a homopolymer, copolymer, or terpolymer.

12. The joint compound of claim 9, comprising about 0.01 wt. % to about 0.1 wt. % polymeric set retarder.

13. The joint compound of claim 9, comprising at least about 60 wt. % calcium carbonate.

14. A joint compound consisting of
    about 20 wt. % to about 37 wt. % of water;
    at least about 50 wt. % of calcium carbonate; and about 0.001 wt. % to about 0.5 wt. % of a water-soluble polymeric set retarder formed from a monomer having at least two moieties bound to successive carbon atoms, wherein the successive carbon atoms form at least a part of the polymer backbone of the polymeric set retarder, and wherein the at least two moieties each contain at least one carboxyl group.

15. A method of producing a joint compound, the method comprising combining a water-soluble polymeric set retarder formed from a monomer having at least two moieties on at least two successive carbon atoms, water, and calcium carbonate to form a stable, drying-type/setting-type hybrid composition; wherein the at least two moieties each contain at least one carboxyl group and the at least two successive carbon atoms form at least a part of the polymer backbone-of the polymeric set retarder.

16. The method of claim 15, herein the monomer is an unsaturated dicarboxylic acid or a derivative of an unsaturated dicarboxylic acid.

17. The method of claim 15, wherein the monomer is selected from the group consisting of maleic acid, derivatives of maleic acid, and mixtures thereof.

18. The method of claim 15, wherein the polymeric set retarder has a weight average molecular weight of about 1,000 to about 15,000.

19. The method of claim 15, wherein the polymeric set retarder is a homopolymer, a copolymer or a terpolymer.

20. The method of claim 15, wherein about 10 wt. % to about 90 wt. % of the polymeric set retarder is formed from the monomer having at least two carboxyl groups.

21. The method of claim 15, wherein the polymeric set retarder is a terpolymer formed from:

maleic acid;

acrylic acid; and a nonionic or anionic monomer.

22. The method of claim 15, wherein the mixture comprises about 0.001 wt. % to about 0.5 wt. % polymeric set retarder.

23. The method of claim 15, wherein the mixture comprises at least about 50 wt. % calcium carbonate.

* * * * *